(12) United States Patent
Zahlen et al.

(10) Patent No.: US 9,492,974 B2
(45) Date of Patent: Nov. 15, 2016

(54) METHOD FOR PRODUCING A FIBER COMPOSITE COMPONENT FOR AVIATION AND SPACEFLIGHT

(75) Inventors: Pierre Zahlen, Hamburg (DE); Torben Jacob, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 950 days.

(21) Appl. No.: 12/309,015

(22) PCT Filed: Jul. 4, 2007

(86) PCT No.: PCT/EP2007/056743
§ 371 (c)(1),
(2), (4) Date: Oct. 26, 2009

(87) PCT Pub. No.: WO2008/003715
PCT Pub. Date: Oct. 10, 2008

(65) Prior Publication Data
US 2010/0044912 A1    Feb. 25, 2010

Related U.S. Application Data

(60) Provisional application No. 60/818,881, filed on Jul. 6, 2006.

(30) Foreign Application Priority Data

Jul. 6, 2006   (DE) .................. 10 2006 031 336

(51) Int. Cl.
*B29C 70/44*        (2006.01)
*B29C 33/48*        (2006.01)
(Continued)

(52) U.S. Cl.
CPC .......... *B29C 70/446* (2013.01); *B29C 33/448* (2013.01); *B29C 33/485* (2013.01);
(Continued)

(58) Field of Classification Search
CPC ... B29C 33/505; B29C 70/30; B29C 70/443; B29C 70/446; B29C 70/543; B29C 2043/3644; B29C 2043/3668; B29C 33/3821; B29C 33/50; B29C 33/485; B29C 33/0033; B29C 33/448; B29C 33/52
USPC ......................................................... 264/642
See application file for complete search history.

(56) References Cited

U.S. PATENT DOCUMENTS 2,244,107 A    6/1941   Hayes
3,143,306 A    8/1964   Dijkmans et al.
(Continued)

FOREIGN PATENT DOCUMENTS

DE    1604528    11/1970
DE    1671756    10/1971
(Continued)

OTHER PUBLICATIONS http://www.lenntech.com/ceramic-membranes.htm.*
(Continued)

*Primary Examiner* — Yogendra Gupta
*Assistant Examiner* — Ninh Le
(74) *Attorney, Agent, or Firm* — Jenkins, Wilson, Taylor & Hunt, P.A.

(57) ABSTRACT

A method for producing a fiber composite component, in particular for aerospace, includes the following method steps: introducing an elastic core sleeve into a prestressing mechanism; expanding the core sleeve that is introduced, for elastic prestressing of the same, by activating the prestressing mechanism; introducing a core body through an opening of the expanded core sleeve; releasing the core sleeve by deactivating the prestressing mechanism, for the snug enclosing of the core body by the core sleeve and thus for the forming of the molding core (14); and at least partly laying at least one semifinished fiber product on the molding core that is formed, for the shaping of the fiber composite component to be produced.

18 Claims, 5 Drawing Sheets

(51) Int. Cl.
*B29C 33/44* (2006.01)
*B29C 33/52* (2006.01)
*B29C 33/50* (2006.01)
*B29C 70/30* (2006.01)
B29C 43/36 (2006.01)
B29L 31/30 (2006.01)

(52) U.S. Cl.
CPC ............ *B29C33/505* (2013.01); *B29C 33/52* (2013.01); *B29C 70/30* (2013.01); *B29C 70/443* (2013.01); *B29C 2043/3644* (2013.01); *B29C 2043/3668* (2013.01); *B29L 2031/3082* (2013.01); *Y02T 50/433* (2013.01)

(56) References Cited

U.S. PATENT DOCUMENTS

| | | | |
|---|---|---|---|
| 3,279,739 A | 10/1966 | Long | |
| 3,279,741 A | 10/1966 | Long | |
| 3,551,237 A | 12/1970 | Cox et al. | |
| 3,629,030 A | 12/1971 | Ash | |
| 3,754,717 A | 8/1973 | Saidla | |
| 3,795,559 A | 3/1974 | Horn et al. | |
| 3,995,081 A | 11/1976 | Fant et al. | |
| 4,094,688 A | 6/1978 | Wolf | |
| 4,155,970 A | 5/1979 | Cassell | |
| 4,248,817 A | 2/1981 | Frank | |
| 4,271,116 A | 6/1981 | Jones | |
| 4,503,105 A | 3/1985 | Tomioka | |
| 4,520,988 A | 6/1985 | Walker | |
| 4,624,874 A | 11/1986 | Schutze | |
| 4,758,397 A | 7/1988 | Schreiner et al. | |
| 4,853,172 A * | 8/1989 | Jacaruso et al. | 264/571 |
| 4,871,599 A | 10/1989 | Knorr | |
| 4,902,458 A * | 2/1990 | Trimble | 264/46.6 |
| 4,943,334 A | 7/1990 | Medney | |
| 5,041,315 A | 8/1991 | Searle et al. | |
| 5,045,251 A | 9/1991 | Johnson | |
| 5,176,864 A | 1/1993 | Bates et al. | |
| 5,260,121 A | 11/1993 | Gardner | |
| 5,262,121 A | 11/1993 | Goodno | |
| 5,376,326 A | 12/1994 | Medney | |
| 5,387,098 A | 2/1995 | Willden | |
| 5,505,492 A | 4/1996 | Nelson | |
| 5,527,414 A | 6/1996 | Dublinski et al. | |
| 5,897,739 A | 4/1999 | Forster | |
| 5,931,830 A | 8/1999 | Jacobsen et al. | |
| 5,989,481 A | 11/1999 | You | |
| 6,013,125 A | 1/2000 | Quraishi et al. | |
| 6,146,576 A * | 11/2000 | Blackmore | 264/404 |
| 6,458,306 B1 | 10/2002 | Nelson et al. | |
| 6,458,309 B1 | 10/2002 | Allen | |
| 6,562,436 B2 | 5/2003 | George et al. | |
| 6,632,502 B1 | 10/2003 | Allen et al. | |
| 6,638,466 B1 | 10/2003 | Abbott | |
| 6,692,681 B1 * | 2/2004 | Lunde | 264/510 |
| 6,889,937 B2 | 5/2005 | Simpson et al. | |
| 7,192,543 B2 | 3/2007 | Malfliet | |
| 7,294,220 B2 | 11/2007 | Anderson | |
| 7,531,058 B2 | 5/2009 | Grose et al. | |
| 8,500,085 B2 | 8/2013 | Jacob et al. | |
| 8,906,489 B2 | 12/2014 | Jacob et al. | |
| 2002/0022422 A1 * | 2/2002 | Waldrop et al. | 442/179 |
| 2002/0038923 A1 | 4/2002 | Lenherr | |
| 2002/0056788 A1 * | 5/2002 | Anderson et al. | 244/119 |
| 2003/0183983 A1 | 10/2003 | Schmidt | |
| 2004/0103918 A1 | 6/2004 | Teufel et al. | |
| 2004/0216805 A1 | 11/2004 | Teufel | |
| 2005/0002269 A1 | 1/2005 | Longo | |
| 2005/0211843 A1 * | 9/2005 | Simpson et al. | 244/119 |
| 2005/0230552 A1 | 10/2005 | Engwall et al. | |
| 2006/0188696 A1 | 8/2006 | Grose et al. | |
| 2007/0096368 A1 | 5/2007 | Hanson et al. | |
| 2007/0108665 A1 | 5/2007 | Glain et al. | |
| 2009/0166921 A1 | 7/2009 | Jacob et al. | |
| 2009/0166935 A1 | 7/2009 | Jacob et al. | |
| 2010/0007044 A1 | 1/2010 | Jacob et al. | |
| 2010/0092708 A1 | 4/2010 | Jacob et al. | |
| 2010/0307694 A1 * | 12/2010 | Dieckmann | 160/22 |
| 2011/0076461 A1 | 3/2011 | Jacob et al. | |

FOREIGN PATENT DOCUMENTS

| | | |
|---|---|---|
| DE | 8711336 | 10/1987 |
| DE | 277234 | 3/1990 |
| DE | 3911312 | 4/1990 |
| DE | 2248239 | 10/1990 |
| DE | 4224526 | 1/1994 |
| DE | 69811606 | 2/2004 |
| DE | 10342867 | 4/2005 |
| DE | WO2008003715 | 1/2008 |
| DE | WO2008003721 | 1/2008 |
| DE | WO2008003733 | 1/2008 |
| DE | WO2008003740 | 1/2008 |
| DE | WO2008003767 | 1/2008 |
| DE | WO2008003768 | 1/2008 |
| EP | 0002711 | 7/1979 |
| EP | 0212140 | 3/1987 |
| EP | 0291203 | 4/1988 |
| EP | 0491650 | 6/1992 |
| EP | 0735639 | 10/1996 |
| EP | 1197309 | 4/2002 |
| EP | 1762355 | 3/2007 |
| FR | 2745745 | 9/1997 |
| FR | WO2007107553 | 9/2007 |
| GB | 1522432 | 8/1978 |
| GB | 2292332 | 4/1994 |
| GB | WO9514563 | 6/1995 |
| GB | 2284173 | 1/1999 |
| JP | 58-018240 | 2/1983 |
| JP | 59-157807 | 10/1984 |
| JP | 61-188425 | 8/1986 |
| JP | 63-310310 | 12/1988 |
| JP | 04-265714 | 9/1992 |
| JP | 06-106632 | 4/1994 |
| JP | 08-142060 | 6/1996 |
| JP | 08-203751 | 8/1996 |
| JP | 08207134 | 8/1996 |
| JP | 11090979 | 4/1999 |
| JP | 2003-071864 | 3/2003 |
| JP | 2003-103643 | 4/2003 |
| JP | 03-277532 | 10/2003 |
| JP | 2006-512240 | 4/2006 |
| JP | 08-203751 | 9/2008 |
| RU | 2080750 | 5/1997 |
| RU | 2143341 C1 | 12/1999 |
| RU | 2217312 | 11/2003 |
| RU | 2242369 C1 | 12/2004 |
| RU | 2271276 C2 | 3/2006 |
| RU | 2285613 C1 | 10/2006 |
| SE | WO9851481 | 11/1998 |
| SU | 204550 | 10/1967 |
| SU | 433038 | 6/1974 |
| SU | 1123235 A2 | 2/1993 |
| WO | WO8701650 | 3/1987 |
| WO | WO 88/01938 | 3/1988 |
| WO | WO 9851481 A1 * | 11/1998 ............ B29C 70/44 |
| WO | WO00/01520 | 1/2000 |
| WO | WO2004000643 | 12/2003 |
| WO | WO2005105402 | 11/2005 |

OTHER PUBLICATIONS

Grant Decision (English) for Russian Application No. 2009103203/05(004165) dated Sep. 5, 2011.
International Search Report and Written Opinion for PCT/EP/2007/056799 dated Sep. 26, 2007.
German Office Action for DE 10 2006 031 323.2 dated Mar. 16, 2007.
International Search Report and Written Opinion for PCT/EP/2007/056856 dated Oct. 29, 2007.
International Search Report and Written Opinion for PCT/EP/2007/056788 dated Oct. 29, 2007.

(56) References Cited

OTHER PUBLICATIONS

German Office Action for DE 10 2006 031 334.8 dated Mar. 15, 2007.
International Search Report and Written Opinion for PCT/EP/2007/056767 dated Nov. 8, 2007.
German Office Action for DE 10 2006 031 326.7 dated Mar. 14, 2007.
International Search Report and Written Opinion for PCT/EP/2007/056855 dated Sep. 25, 2007.
German Office Action for DE 10 2006 031 335.6 dated Mar. 15, 2007.
International Search Report and Written Opinion for PCT/EP/2007/056743 dated Nov. 14, 2007.
German Office Action for DE 10 2006 031 336.4 dated Mar. 21, 2007.
AIRTECH, Masterflex "S" Series (Mar. 24, 1997).
Final Office Action for U.S. Appl. No. 12/227,679 dated Mar. 23, 2010.
Non-Final Office Action for U.S. Appl. No. 12/309,083 dated Nov. 15, 2010.
Final Office Action for U.S. Appl. No. 12/227,679 dated Jan. 19, 2011.
Final Office Action for U.S. Appl. No. 12/309,083 dated Apr. 4, 2011.
Final Office Action for U.S. Appl. No. 12/227,679 dated Mar. 6, 2009.
Chinese Grant Notification for CN Appl. No. 2007 8002 5659.0 dated Feb. 1, 2012.
Office Action/Restriction Requirement for U.S. Appl. No. 12/308,793 dated Mar. 19, 2012.
Non-Final Office Action for U.S. Appl. No. 12/309,083 dated Apr. 23, 2012.
Notice of Allowance for U.S. Appl. No. 12/227,659 dated Apr. 24, 2012.
Non-Final Office Action for U.S. Appl. No. 12/308,793 dated Jun. 12, 2012.
Final Office Action for U.S. Appl. No. 12/227,679 dated Jul. 2, 2012.
V.P. Pustovoitov "Fibreglasses in building construction", Moscow, Stroyzdat, pp. 64-65 (1978).
"Hand Book of Adhesives" pp. 80-81 (1980).
Decision on Grant for Russian Patent Application No. 2009102870/05(003680) dated Jun. 8, 2011.
Advisory Action for U.S. Appl. No. 12/309,083 dated Jun. 9, 2011.
Decision on Grant for Russian Patent Application No. 2009102868/05(003677) dated Jun. 16, 2011.
Decision to Grant for Russian Appication No. 2009/102869/05(003679) dated Jun. 24, 2011.
Decision to Grant for Russian Application No. 2009/103204/05(004166) dated Jun. 24, 2011.
Non-Final Office Action for U.S. Appl. No. 12/227,659 dated Aug. 3, 2011.
Notice of Allowance for U.S. Appl. No. 12/227,659 dated Aug. 1, 2012.
Japanese Office Action for Application Serial No. JP 2009-517267 dated Jul. 11, 2012.
Japanese Office Action for Application Serial No. JP 2009-517264 dated Jul. 11, 2012.
Final Office Action for U.S. Appl. No. 12/309,083 dated Sep. 6, 2012.
Advisory Action for U.S. Appl. No. 12/227,679 dated Jul. 2, 2010.
Non-Final Office Action for U.S. Appl. No. 12/227,679 dated Aug. 2, 2010.
Japanese Office Action for Application Serial No. JP 2009-517271 dated Jul. 11, 2012.
Japanese Office Action for Application Serial No. JP 2009-517271 (with Engl. Transl.) dated Jul. 11, 2012.
Final Office Action for U.S. Appl. No. 12/308,793 dated Nov. 6, 2012.
Non-Final Office Action for U.S. Appl. No. 12/309,083 dated Aug. 16, 2011.
Non-Final Office Action for U.S. Appl. No. 12/227,659 dated Nov. 1, 2011.
Non-Final Office Action for U.S. Appl. No. 12/227,679 dated Sep. 16, 2009.
Decision to Grant (English) for Russian Application No. 2009/103205/05(004168) dated Oct. 19, 2011.
Non-Final Office Action for U.S. Appl. No. 12/227,679 dated Dec. 6, 2011.
Final Office Action for U.S. Appl. No. 12/309,083 dated Dec. 7, 2011.
Non-Final Office Action for U.S. Appl. No. 12/227,679 dated Nov. 21, 2012.
Chinese Grant for Application Serial No. 200780021406.6 dated Oct. 10, 2012.
Notice of Allowance for U.S. Appl. No. 12/227,659 dated Dec. 6, 2012.
Japanese Office Action for Application No. 2009-517281 dated Oct. 5, 2012.
Notice of Allowance for U.S. Appl. No. 12/227,659 dated Feb. 21, 2013.
Non-Final Office Action for U.S. Appl. No. 12/309,083 dated Mar. 19, 2013.
Office Action (RR) for U.S. Appl. No. 12/308,792 dated Apr. 11, 2013.
Notice of Allowance for U.S. Appl. No. 12/227,659 dated Apr. 12, 2013.
Non-Final Office Action for U.S. Appl. No. 12/308,793 dated May 29, 2013.
Final Office Action for U.S. Appl. No. 12/227,679 dated Jun. 28, 2013.
Final Office Action for U.S. Appl. No. 12/309,083 dated Aug. 1, 2013.
Non-Final Office Action for U.S. Appl. No. 12/308,792 dated Aug. 16, 2013.
Non-Final Office Action for U.S. Appl. No. 12/227,679 dated Oct. 24, 2013.
Final Office Action for U.S. Appl. No. 12/308,793 dated Nov. 12, 2013.
Non-Final Office Action for U.S. Appl. No. 12/309,083 dated Dec. 2, 2013.
Notice of Allowance for U.S. Appl. No. 12/308,792 dated Oct. 31, 2014.
Interview Summary for U.S. Appl. No. 12/308,792 dated Oct. 31, 2014.
Final Office Action for U.S. Appl. No. 12/309,083 dated Mar. 27, 2014.
Final Office Action for U.S. Appl. No. 12/308,792 dated Feb. 28, 2014.
Final Office Action for U.S. Appl. No. 12/227,679 dated Apr. 7, 2014.
Non-Final Office Action for U.S. Appl. No. 12/308,793 dated Mar. 13, 2014.
Final Office Action for U.S. Appl. No. 12/308,793 dated Jul. 30, 2014.
Non-Final Office Action for U.S. Appl. No. 12/309,083 dated Jun. 10, 2014.
Notice of Allowance for U.S. Appl. No. 12/308,792 dated Aug. 13, 2014.
Advisory Action for U.S. Appl. No. 12/227,679 dated Aug. 5, 2014.
Non-Final Office Action for U.S. Appl. No. 12/227,679 dated Aug. 13, 2015.
Interview Summary for U.S. Appl. No. 12/227,679 dated Nov. 20, 2015.
Final Office Action for U.S. Appl. No. 12/227,679 dated Mar. 24, 2016.

* cited by examiner

METHOD FOR PRODUCING A FIBER COMPOSITE COMPONENT FOR AVIATION AND SPACEFLIGHT

FIELD OF THE INVENTION

The present invention relates to a method for producing a fiber composite component, in particular for aviation and spaceflight, to a molding core for producing such a fiber composite component and to a fiber composite component with at least one stringer which is produced by means of such a molding core and/or such a method.

BACKGROUND OF THE INVENTION

Although it can be applied to any desired fiber composite components, the present invention and the problems on which it is based are explained in more detail below with reference to two-dimensional stringer-stiffened carbon fiber reinforced plastic (CRP) components, for example skin shells of an aircraft.

It is generally known to stiffen CRP skin shells with CRP stringers in order to withstand the loads occurring in the aircraft sector with the lowest possible additional weight. In this respect, a distinction is drawn essentially between two types of stringers: T and Ω stringers.

The cross section of T stringers is made up of a base and a stem. The base forms the connecting surface with respect to the skin shell. The use of skin shells stiffened with T stringers is widespread in aircraft construction.

Ω stringers have something like a hat profile, its ends being connected to the skin shell. Ω stringers may either be adhesively attached in the cured state to the likewise cured skin shell, or be cured wet-in-wet at the same time as the shell. The latter is desired, because it is more favourable from technical aspects of the process. However, supporting or molding cores are necessary for the wet-in-wet production of skin shells stiffened with Ω stringers, in order to fix and support the dimensionally unstable semifinished fiber products in the desired Ω shape during the production process. Skin shells with Ω stringers have the advantage over T stringers that they allow better infiltration during an infusion process for introducing a matrix, for example an epoxy resin, into the semifinished fiber products. Infusion processes are less costly than other known methods for producing fiber composite components, such as the prepreg process for example, because this allows the use of lower-cost semifinished fiber products.

However, there is the problem with the production of Ω stringers that the material used at present for the supporting or molding core is cost-intensive and can only be removed with difficulty after the forming of the Ω stringers, with the result that the material remaining in the stringers contributes adversely to the weight of the fiber composite component, and consequently to the weight of the aircraft. Furthermore, it is problematic that the material remaining in the stringers contributes adversely to the overall weight of the aircraft.

SUMMARY OF THE INVENTION

Against this background, it is one of the objects of the present invention to provide a lower-cost and lighter fiber composite component, in particular for aviation and spaceflight.

Accordingly, a method for producing a fiber composite component, comprising the following method steps: introducing an elastic core sleeve into a prestressing mechanism; expanding the core sleeve that is introduced, for elastic prestressing of the same, by activating the prestressing mechanism; introducing a dimensionally stable core body through an opening of the expanded core sleeve; releasing the expanded core sleeve by deactivating the prestressing mechanism, to snugly enclose the core body with the core sleeve and to thus form the molding core; and at least partly laying at least one semifinished fiber product on the molding core that is formed, to shape the fiber composite component to be produced.

Also provided is a molding core for producing a fiber composite component, in particular a stringer, on a base part in aviation and spaceflight, comprising a core sleeve, which forms an outer surface of the molding core, and a core body, which is at least partially enclosed by the core sleeve.

Also provided is a fiber composite component with at least one stringer, in particular in aviation and spaceflight, which is produced by means of a molding core according to the invention and/or a method according to the invention.

Consequently, the present invention may have the advantage over the approaches mentioned at the beginning that the fiber composite component can be produced by means of a lower-cost molding core, since, instead of an expensive material, a lower-cost material is advantageously used for the molding core.

According to one particular embodiment, a vacuum on an outer surface of the core sleeve for expanding the same is produced by means of the prestressing mechanism when the prestressing mechanism is activated. In the relaxed state, the core sleeve may have a smaller diameter than the core body intended for pushing into the core sleeve. By means of the prestressing mechanism, the core sleeve is then expanded or stretched so far with respect to its diameter that the core body can be pushed in, in the longitudinal direction of the core sleeve. For this purpose, the vacuum produces a force acting essentially radially in relation to the core sleeve on the latter and consequently elastically prestresses the latter. If the core body is then pushed into the expanded core sleeve and then, by means of the pre-tensioning mechanism, the vacuum on the outer surface of the core sleeve is released by the deactivation of the prestressing mechanism, the core sleeve constricts in the radial direction snugly around the core body and consequently forms the molding core.

This consequently achieves the advantage that a core body can be surrounded with a core sleeve in a very simple way. Such a core sleeve on the one hand takes over the function of "releasing" the molding core from the CRP, so that in the subsequent removal of the molding core no adhesive attachment to the CRP wall has to be overcome. On the other hand, the function of "sealing" is provided. As a result, in the case of core materials that contain air or are porous, resin is prevented from penetrating into the core from the fiber composite component and, conversely, air is prevented from escaping from the molding core into the CRP laminate.

In this application, "releasing a vacuum" or "ending a vacuum" is understood as meaning a pressure equalization to an ambient pressure, for example atmospheric pressure, in the space having the vacuum.

In the case of one particular embodiment of the invention, the opening of the core sleeve is closed by means of welding and/or adhesive bonding after the prestressing mechanism is deactivated. In particular in the case of complete encapsulation of the molding core with semifinished fiber products, an exchange of materials between the molding core and the semifinished fiber products can consequently be reliably prevented from taking place. If the molding core is completely surrounded by semifinished fiber products, it may be necessary for the fiber composite component first to be machined to open up access to the molding core after curing of the fiber composite component. The molding core can subsequently be removed.

Alternatively, the core sleeve may be brought into sealing contact with a circumference of the core body, with an edge region forming the opening, by the deactivation of the prestressing mechanism. In this case, the core sleeve consequently does not completely enclose the core body. Therefore, in the case of this embodiment of the invention, for example only the part of the core body that is surrounded by the core sleeve is used for molding and supporting the semifinished fiber products for producing the fiber composite component. The portion of the core body that does not have any core sleeve in this case protrudes from the fiber composite component to be produced. Once the fiber composite component has been cured, the core body can be removed more easily from the fiber composite component, because a direction of movement of the molding core, in particular in the longitudinal direction of the molding core, has been released.

BRIEF DESCRIPTION OF THE DRAWINGS

The invention is explained in more detail below on the basis of the exemplary embodiment represented in the schematic figures of the drawing, in which.

In the figures, the same reference numbers refer to identical or functionally identical components unless otherwise stated.

DETAILED DESCRIPTION OF THE INVENTION

FIGS. 1 to 5 schematically show a number of method steps according to an exemplary embodiment of the present invention.

Figure 1A:
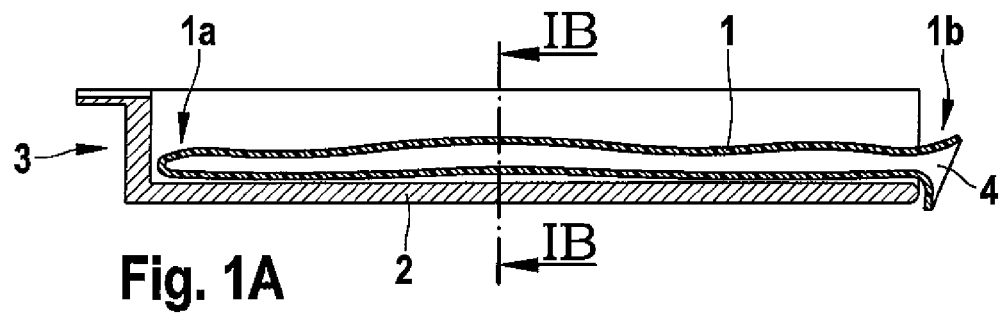
FIG. 1-4 show a number of method steps for producing the molding core according to an exemplary embodiment of the present invention.
Figure 1B:
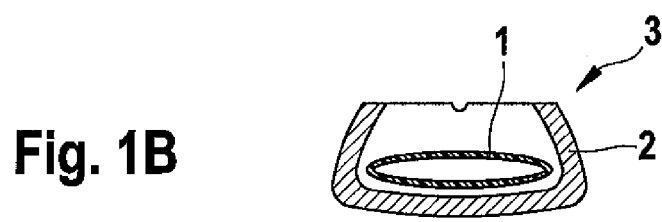

In a first method step according to the present exemplary embodiment, represented in FIGS. 1A and 1B, a core sleeve 1 is introduced into a lower part 2 of a prestressing mechanism 3. According to the present exemplary embodiment, the core sleeve 1 is formed from an elastic and/or dimensionally unstable material, for example a plastic, in particular a polyamide and/or a PTFE plastic.

The core sleeve 1 lies with its longitudinal axis essentially parallel to a longitudinal axis of the prestressing mechanism 3 in the same. The lower part 2 may be formed as a first half of a pipe cut through along its length. The core sleeve 1 is formed as an elastic flexible tube, which is formed such that it is closed at its one end 1a and is provided with an opening 4 at its other end 1b. Alternatively, the lower part 2 and the upper part 5 of the prestressing mechanism 3 could also be formed as one part.

Figure 2A:
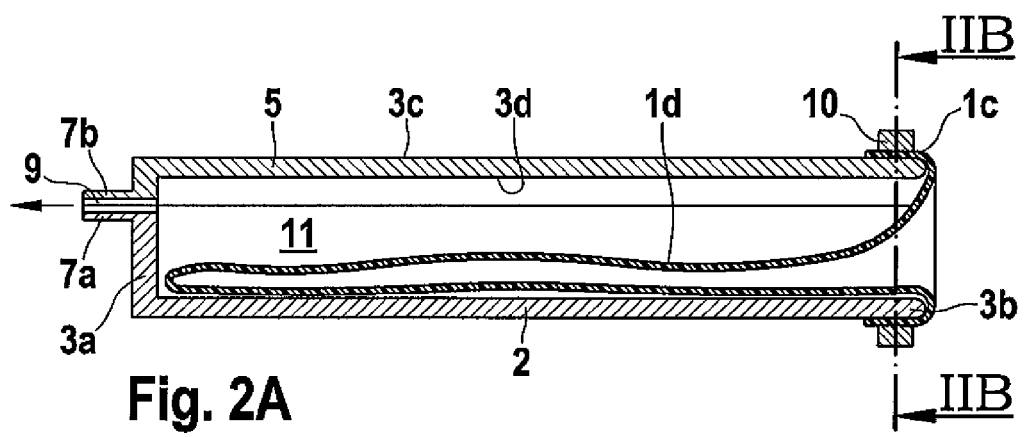
Figure 2B:
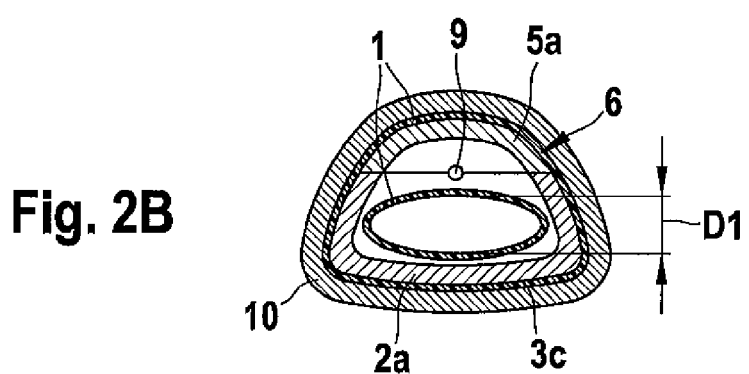

Subsequently, as illustrated in FIGS. 2A and 2B, an upper part 5, which may be formed as the second half of the pipe cut through along its length, is placed onto the lower part 2 of the prestressing mechanism 3.

In the assembled state of the prestressing mechanism 3, the cross section 5a of the upper part 5 and the cross section 2a of the lower part 2 form an essentially airtight pipe cross section 6. The pipe cross section 6 may be adapted to the molding core cross section and formed such that it is essentially trapezoidal with rounded corners. Alternatively, the pipe cross section 6 may be formed for example such that it is triangular, oval, round and/or wavy.

Molded-on portions 7a and 7b on the upper part and lower part, respectively, together form, for example, a channel 9. The channel 9 is connected to a vacuum pump (not represented).

In a next method step, an edge region 1c of the core sleeve 1 is closed in an airtight manner with respect to the pipe cross section 6, and may be slipped over a right-hand end 3b of the prestressing mechanism 3. The turned-back edge region 1c can be fastened by means of a clamping ring 10 on an outer circumference 3c of the prestressing mechanism.

Consequently, an adequately airtight space 11 is formed, delimited by an outer side 1d of the core sleeve 1 and an inner wall 3d of the prestressing mechanism. The clamping ring 10 thereby prevents air from escaping between the outer side 1d of the core sleeve 1 and the prestressing mechanism 3 by means of its clamping action.

Figure 3A:
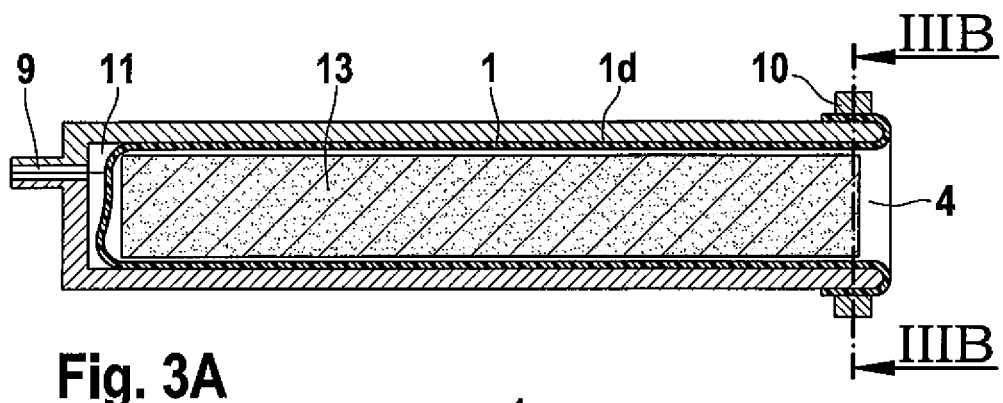
Figure 3B:
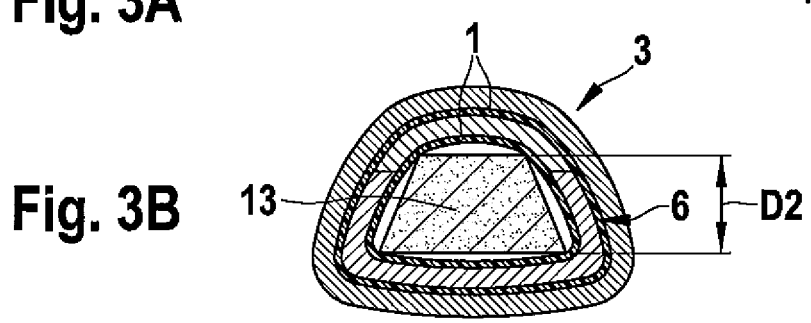

In a next method step according to the present exemplary embodiment, as shown in FIGS. 3A and 3B, the prestressing mechanism 3 is activated, i.e. the vacuum pump is switched to evacuation of the space 11. As a result, the outer side 1d of the core sleeve 1 comes to lie snugly against the inner wall 3d of the prestressing mechanism 3. This causes an expansion of the elastic material of the core sleeve 1, whereby it is prestressed, in particular in the radial direction, i.e. perpendicularly to the longitudinal direction.

In a next method step, a dimensionally stable core body 13 is pushed into the opening 1b expanded in this way of the core sleeve 1.

Subsequently, the prestressing mechanism 3 is deactivated, i.e. the vacuum in the space 11 is released, whereby the pressure in the space 11 is equalized to an outside pressure, that is to say atmospheric pressure.

In the relaxed state, a diameter D1 of the core sleeve 1 is smaller than a diameter D2 of the core body 13. The prestressed core sleeve consequently relaxes only slightly and thereby comes to lie firmly around the core body 13 in the circumferential direction.

Figure 4A:
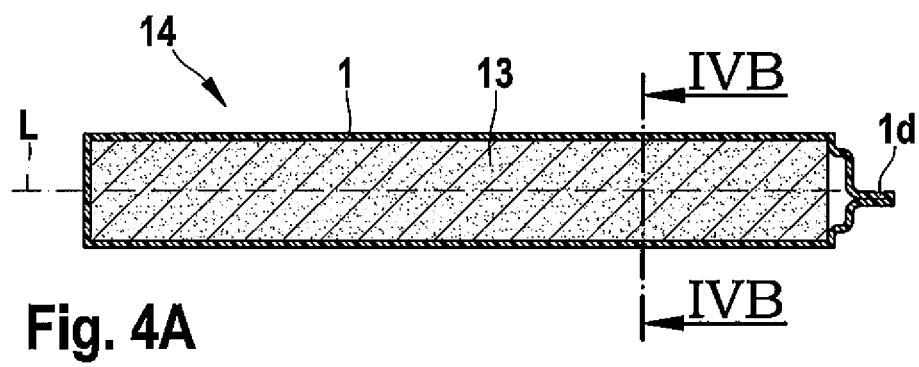
Figure 4B:
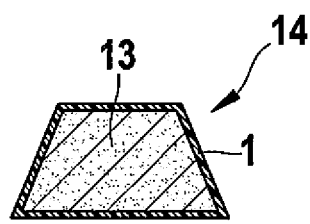

After that, the clamping ring 10 can be removed and the molding core 14 consequently produced can be removed from the prestressing mechanism 3, as represented in FIG. 4A and FIG. 4B.

In a further method step according to the present exemplary embodiment, the edge regions 1c of the core sleeve may be welded together. Such welding together prevents an exchange of materials between the core body 13 and the fiber composite component to be produced (represented in FIG. 5B) while the core body 13 is inside the same.

Alternatively, the core 13 may be formed with such a length that it protrudes beyond the end 3b on the opening side of the prestressing mechanism 3 in the method step represented in FIGS. 3A and 3B. If the clamping ring 10 is removed, the edge regions 1c cannot be welded together for geometrical reasons, but come to lie snugly around the protruding portion 13a (as represented in FIG. 5B) of the core body 13.

The molding core 14 is suitable for producing a fiber composite component 22 which is intended to have geometric portions that correspond at least partly to those of the molding core 14.

Generally, the molding core 14 can be used in various methods for producing a fiber composite component, such as for example manual lamination, prepreg or vacuum injection process. However, the use of the molding core in a vacuum infusion process is to be presented by way of example.

Figure 5A:
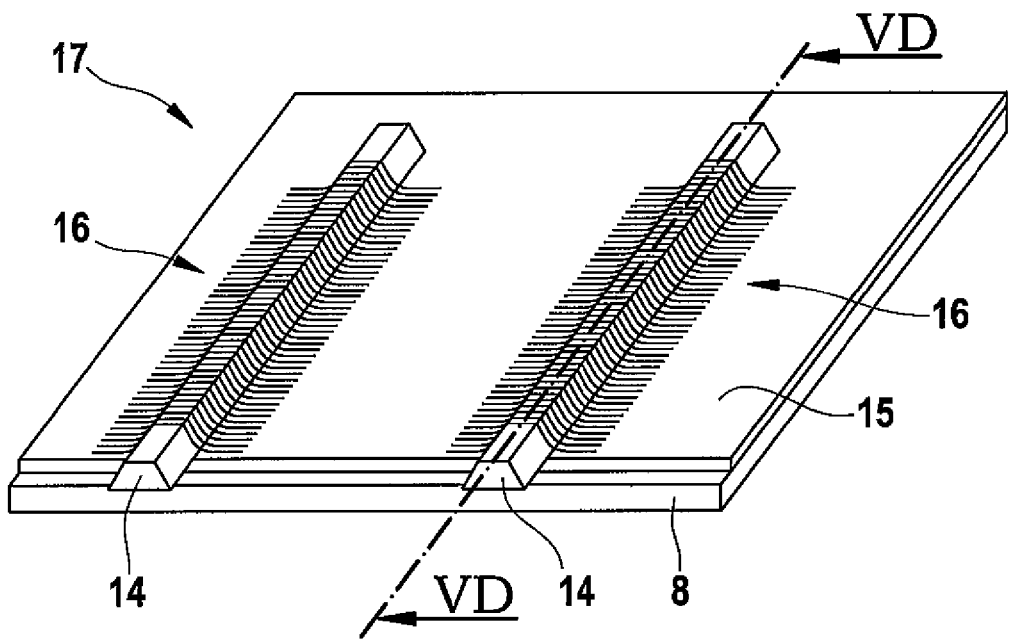
FIG. 5 A-C show further method steps for producing the fiber composite component according to the exemplary embodiment.
Figure 5B:
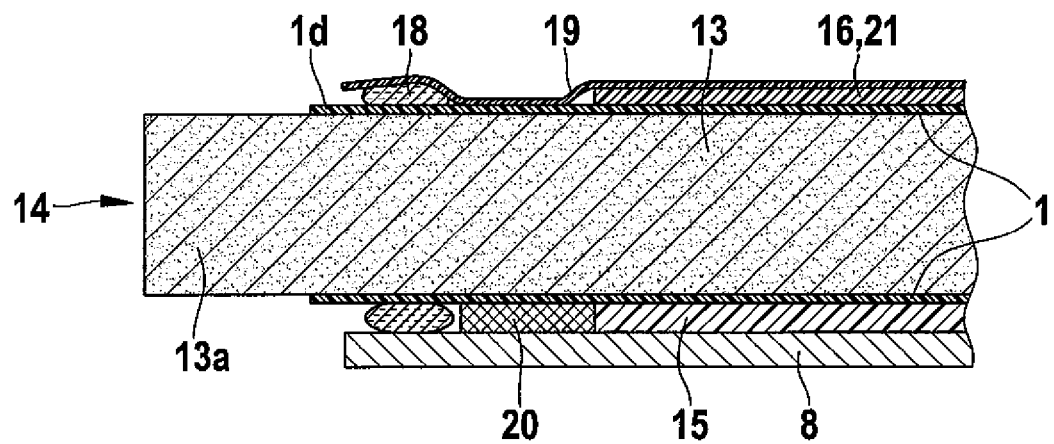
Figure 5C:
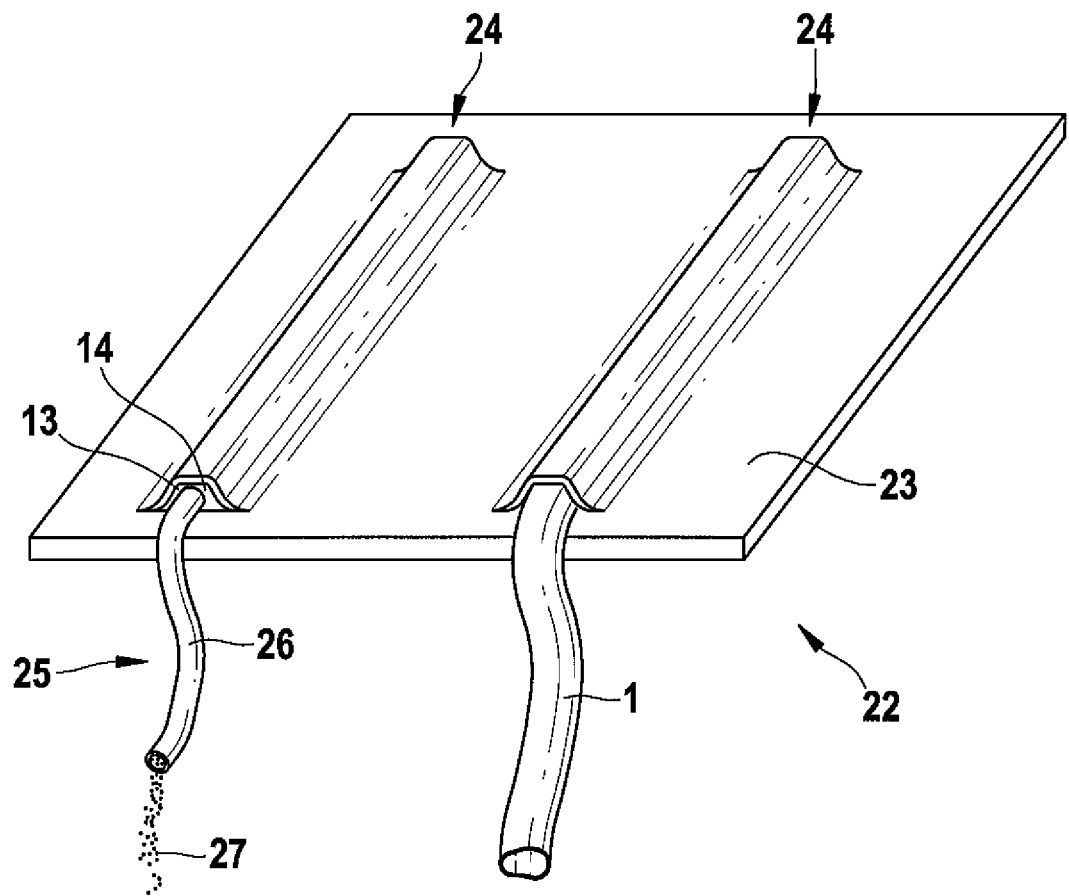

FIGS. 5A to 5C illustrate further method steps for producing the fiber composite component according to the present exemplary embodiment.

As illustrated in FIG. 5A, the molding cores 14 may be arranged on a base part 15 of semifinished fiber products, for example of laid fiber fabrics. Subsequently, further semifinished fiber products 16 are laid flat on the molding cores in such a way that they are at least partly in contact with the latter and assume an inner shape that corresponds to the outer shape of the molding cores.

FIG. 5B shows a view along the direction of the arrow A in FIG. 5A. In the case of this exemplary embodiment, a molding core 14 which has the protruding portion 13a that is not covered by the core sleeve 1 is used. In the edge region 1d of the core sleeve, a sealing glue 18 is introduced. Subsequently, the further semifinished fiber products 16 and the base part 15 are covered in an airtight manner with a sealing film 19. The sealing film 19 thereby terminates with the sealing glue 18, the sealing glue 18 sealing the space between the sealing film 19 and the core sleeve 1 in an airtight manner. Furthermore, a filling piece 2, which supports the molding core in the region between the end of the semifinished fiber product 16 and the sealing glue, can be introduced.

Subsequently, a vacuum is applied to the space sealed by the sealing film and a connection to this space with the matrix 21 is provided. If the space beneath the sealing film is then evacuated, the matrix 21 is evenly distributed in the semifinished fiber products 16 and in the base part 15. The core sleeve 1 forms here a sealing layer which prevents the matrix 21 from penetrating into the core body 13 and/or prevents substances, in particular air, from escaping from the core body 13 into the fiber composite component 22 to be produced.

In a further method step, the arrangement 17 is arranged in an autoclave or oven (not represented) and cured under pressure and/or heat. The core sleeve 1 may therefore be formed from a material that withstands the necessary process temperatures in the range of, for example, 180 degrees without losing its "sealing" and "releasing" functions and/or deforming outside predetermined tolerances.

The cured arrangement 17 then has a fiber composite component 22, as shown in FIG. 5C, with a hard shell 23, which is reinforced by approximately Ω-shaped stringers 24.

There are various possibilities for removing the molding cores 14. For example, the core body 13, which is formed for example from water-soluble material, may be flushed out by means of a water jet. For this purpose, a flushing-out device 25 is provided, having a hose 26, by means of which water and flushed-out core body material 27 are carried away.

Alternatively, the core body 14 may simply be drawn out from the Ω-shaped stringer 24 in the longitudinal direction. For this purpose, the core sleeve 1 is provided on its inner side with a coating with sliding properties or is produced from a material with suitable sliding properties, i.e. the core sleeve 1 has, for example, a release layer that prevents the core body 13 from adhesively attaching itself to the core sleeve 1. The core sleeve 1 consequently remains in the Ω-shaped stringer 24, but only contributes slightly to the weight of the component 22.

Although the core sleeve 1 could remain in the Ω-shaped stringer 24, there is the possibility of removing the core sleeve 1 in various ways.

Figure 6:
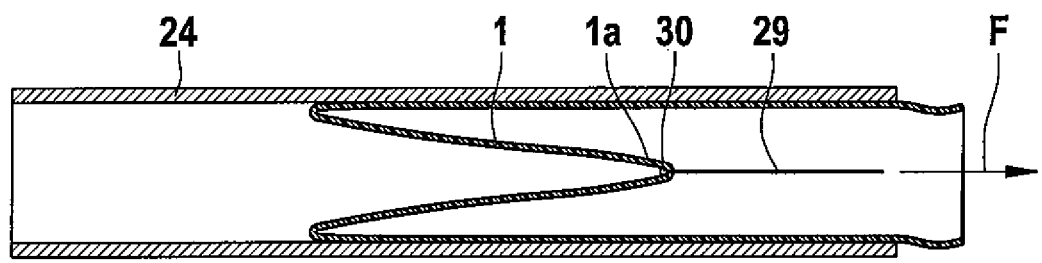
FIGS. 6 and 7 show further method steps for removing the core sleeve according to the exemplary embodiment.
Figure 7:
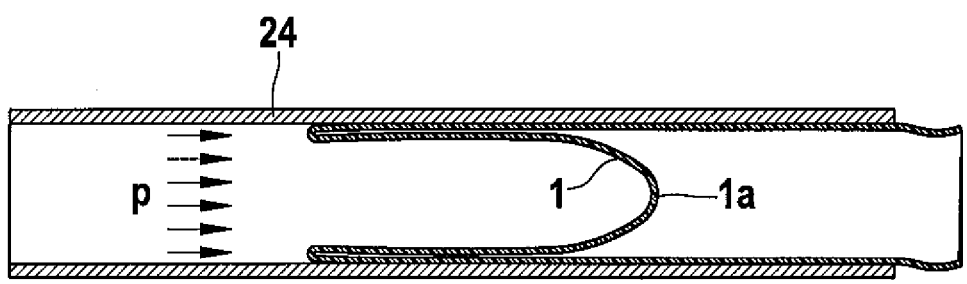

FIGS. 6 and 7 show further method steps for removing the core sleeve according to the exemplary embodiment of the present invention.

As illustrated in FIG. 6, a line 29 is fastened to a fastening point 30 on the core sleeve 1. Subsequently, a force F is applied to the line 29 in the longitudinal direction of the stringer 24, and consequently the core sleeve 1 is drawn out from the stringer 24. The core sleeve 1 thereby may comprise a release layer, which prevents adhesive attachment of the fiber composite component 22 produced to the core sleeve 1. Alternatively, a ram by means of which the core sleeve 1 is pressed out may be used.

In FIG. 7, an air pressure P is applied to the closed end 1a of the core sleeve 1 along the longitudinal direction of the stringer 24 and presses the core sleeve 1 out from the stringer 24 in the longitudinal direction of the latter.

The method explained can also be used particularly advantageously for producing molding cores 14 with a cross section that is variable in the longitudinal direction L. If, for example, a water-soluble core body 13 is used, it is then possible after the at least partial curing of the fiber composite component 22 and flushing out of the core body 13 for the molding core 14 to be removed without any problem from the stringer 24 produced, which then has a variable cross section. The core body material 27 can later be used again for forming a new core body 13.

The invention is not restricted to the specific method represented in the figures for producing a fiber composite component for aviation and spaceflight.

Furthermore, the individual sequence of individual method steps of the production method according to the invention can be changed in various ways. The form taken by the individual method steps can also be modified. For example, extraction of the core sleeve by suction instead of it being pressed out under pressure may be carried out for removing the core sleeve from the stringer produced.

Furthermore, the geometry of the molding core can be modified in various ways.

Furthermore, it is also possible for a number of molding cores to be used to form a single molding core, around which laid fiber fabrics are placed. The aim here is to create a more complex geometry by means of the multiplicity of molding cores. Consequently, more complex fiber composite components can be produced.

What is claimed is:

1. A method for producing a fiber composite component, the method comprising:
introducing an elastic core sleeve into a prestressing mechanism, wherein the elastic core sleeve comprises a closed end and an open end;
fastening a turned-back edge of the elastic core sleeve by a clamping ring on an outer circumference of the prestressing mechanism, wherein the clamping ring prevents air from escaping between an outer side of the core sleeve and the prestressing mechanism by clamping action during activation of the prestressing mechanism;
expanding the core sleeve that is introduced, for elastic prestressing of the core sleeve, by activating the prestressing mechanism, wherein the prestressing mechanism is divided lengthwise into a lower part and an upper part for opening the prestressing mechanism along its length to place the core sleeve therein;

wherein the lower part and the upper part form a closed first end;

wherein the prestressing mechanism is provided with a channel adapted to be connectable to a vacuum pump, wherein the channel is located at a rear of the prestressing mechanism and in a longitudinal direction of the prestressing mechanism and is formed by mating of the upper and lower part together, and wherein the closed first end is perpendicular to the channel;

wherein the lower part and the upper part form an open second end to introduce the core sleeve through the open second end and place the core sleeve inside the prestressing mechanism, and wherein a vacuum on an outer surface of the core sleeve is produced by the vacuum pump connected to the channel for expanding the core sleeve by the prestressing mechanism when the prestressing mechanism is activated;

introducing a dimensionally stable core body through an opening of the expanded core sleeve, wherein the dimensionally stable core body is formed as a one-piece with a desired shape;

releasing the expanded core sleeve by deactivating the prestressing mechanism, to snugly enclose the core body, which comprises the desired shape, with the core sleeve to form a molding core comprising the desired shape of the core body; and at least partly laying at least one semi-finished fiber product on the molding core that is formed, to shape the fiber composite component to be produced.

2. The method according to claim 1, wherein the prestressing mechanism is formed as a portion of pipe with a closed cross section.

3. The method according to claim 1, wherein the prestressing mechanism is provided with the opening for inserting the core body.

4. The method according to claim 3, wherein the core sleeve is attached in a region of the opening of the core sleeve in an opening of the prestressing mechanism for the airtight closing of the prestressing mechanism.

5. The method according to claim 1, wherein the opening of the core sleeve is closed by at least one of welding and adhesive bonding after the prestressing mechanism is deactivated.

6. The method according to claim 1, wherein the core sleeve is brought into sealing contact with a circumference of the core body with an edge region forming the opening by the deactivation of the prestressing mechanism.

7. The method according to claim 1, wherein the molding core is removed from the prestressing mechanism after deactivation of the prestressing mechanism.

8. The method according to claim 1, wherein the molding core is arranged on a base component of semi-finished fiber composite products and/or is at least partially surrounded in a region of the core sleeve by semi-finished fiber products for forming at least a portion of the fiber composite component.

9. The method according to claim 1, wherein the molding core is arranged such that it protrudes from the semi-finished fiber products surrounding it for forming the fiber composite component.

10. The method according to claim 9, wherein a matrix is introduced into the at least one semi-finished fiber product, and wherein the protruding portion of the molding core is provided with sealing elements for sealing the semi-finished fiber products at least during the introduction of the matrix.

11. The method according to claim 1, wherein the molding core is arranged such that it is completely enclosed by semifinished semi-finished fiber products for forming the fiber composite component.

12. The method according to claim 1, wherein a matrix is introduced into the at least one semi-finished fiber product with the molding core and is subsequently at least partially cured under pressure and/or heat to form the fiber composite component.

13. The method according to claim 12, wherein the at least partially cured fiber composite component is machined for removal of the core body and/or the core sleeve.

14. The method according to claim 12, wherein after the at least partial curing of the fiber composite component the core body is removed from the fiber composite component.

15. The method according to claim 14, wherein the core body is removed from the fiber composite component by at least one of washing out, suction extraction, and mechanically drawing out the core body.

16. The method according to claim 12, wherein the core sleeve is removed from the at least partially cured fiber composite component.

17. The method according to claim 16, wherein the core sleeve is removed by compressed air, suction extraction, washing out and/or mechanical drawing out, a suitable engaging element on the core sleeve being brought into engagement with a means for removing the sleeve.

18. The method according to claim 1, wherein the method for producing the fiber composite component takes a form of at least one of hand lay-up, prepreg, transfer molding and vacuum infusion process.

* * * * *